United States Patent [19]

Bähring

[11] 4,407,544
[45] Oct. 4, 1983

[54] APPARATUS FOR ELIMINATION PLAY IN GEAR WHEEL TRANSMISSIONS

[75] Inventor: Horst Bähring, Mühltal, Fed. Rep. of Germany

[73] Assignee: Privates Institut für Physikalisch Technische Auftragsforschung GmbH, Reinheim, Fed. Rep. of Germany

[21] Appl. No.: 229,578

[22] PCT Filed: May 24, 1980

[86] PCT No.: PCT/EP80/00029
 § 371 Date: Jan. 28, 1981
 § 102(e) Date: Jan. 7, 1981

[87] PCT Pub. No.: WO80/02677
 PCT Pub. Date: Dec. 11, 1980

[30] Foreign Application Priority Data

May 28, 1979 [DE] Fed. Rep. of Germany ....... 2921588

[51] Int. Cl.³ ............................................. A47C 1/025
[52] U.S. Cl. ..................................... 297/362; 74/440; 74/804
[58] Field of Search ...................... 297/362, 355, 348; 74/411.5, 440, 804, 805; 248/422

[56] References Cited

U.S. PATENT DOCUMENTS 4,025,109 5/1977 Klingelhofer et al. ......... 297/362 X
4,227,741 10/1980 Gross et al. ................. 297/362

FOREIGN PATENT DOCUMENTS

532583 7/1920 France .................................. 74/440

Primary Examiner—William E. Lyddane
Attorney, Agent, or Firm—Michael J. Striker

[57] ABSTRACT

Apparatus for eliminating play between two interengaged gear wheels (4,10) of a gear wheel transmission includes a pair of disc-like transmission elements (1,2) which may be embodied in different forms. In one form of embodiment the elements (1,2) comprise two single eccentrics which are arranged movably relative to each other and so as to constitute a double eccentric. The central axis (2M) of the eccentric (2) is concentric with respect to the axis of rotation (10D) of the gear wheel (10). The spacing of the axes of rotation (4D,10D) of the two gear wheels (4,10) is a function of the eccentricity of the double eccentric (1,2). A spring (12) is connected to both eccentrics (1,2) in such a way that the two eccentrics (1,2) are pivoted relative to each other by the spring force in a direction such that the total eccentricity increases and thus play between the gear wheels (4,10), which are connected to the two eccentrics (1,2), is removed. A handle (16) is connected to a gear wheel (10) by way of an adjusting shaft (5) and the double eccentric (1,2) in such a way that, upon rotary movement in either of the two directions of rotation, said gear wheel is rotated relative to the other gear wheel (4) and at the same time an eccentric (1 or 2) is moved in the direction of slightly increasing the play between the two gear wheels (4,10).

27 Claims, 11 Drawing Figures

APPARATUS FOR ELIMINATION PLAY IN GEAR WHEEL TRANSMISSIONS

BACKGROUND OF THE INVENTION

This invention relates to apparatus for eliminating play between two interengaged gear wheels of a gear wheel transmission which is self-locking in relation to a moment of rotation acting on the output side. Apparatuses of this kind can be used in particular in eccentric transmission systems in hinge fittings of motor vehicle seats with an adjustable backrest, but they can also be used in drafting machines and in other applications.

Eccentric transmission systems are known from DE No. 2 734 568A. They are used in many situations. In many cases it is desirable to eliminate the play which is present in known eccentric transmission systems.

Previously known apparatuses for eliminating the play between interengaging gear wheels of a gear wheel transmission are expensive and are therefore unsuitable for many purposes, for example for use in a gear wheel transmission system for adjusting the inclination of the backrest of a motor vehicle seat.

SUMMARY OF THE INVENTION

It is an object of the invention to eliminate the play in a gear wheel transmission by simple means which can be comparatively simple produced in a compact design, and can thus be used in many cases in which the previously known apparatuses cannot be employed.

According to the present invention there is provided apparatus for eliminating play between two interengaged gear wheels of a gear wheel transmission which is self-locking in relation to a moment of rotation acting on the output side, characterised by the combination of the following features:

(a) the central axis of one disc-like transmission element is concentric with respect to the axis of rotation of one gear wheel;

(b) the spacing of the axes of rotation of the two gear wheels is a function of the rotation of the disc-like transmission elements relative to each other;

(c) a spring is connected to both disc-like transmission elements in such a way that the two disc-like transmission elements are pivoted relative to each other by the spring force in a direction, such that the displacement of the central axes of the disc-like transmission elements relative to each other in radial direction increases and thus play between the gear wheels, which are connected to the disc-like transmission elements, is removed; and (d) a handle is connected to a gear wheel by way of an adjusting shaft and the disc-like transmission elements in such a way that, upon rotary movement in either of the two directions of rotation, said gear wheel is rotated relative to the other gear wheel and at the same time a disc-like transmission element is moved in the direction of slightly increasing the play between the two gear wheels.

This arrangement ensures that, in the event of possible incipient jamming of the gear wheels, by taking advantage of the friction between parts which are moved, a small amount of play can be produced between the gear wheels and thus any jamming can be avoided.

In many cases it is advantageous to employ in embodiment of the invention in which the disc-like transmission elements are in the form of two single eccentrics which are arranged movably relative to each other and which are arranged as a double eccentric, means are provided which cause the spacing of the axes of rotation of the two gear wheels to be a function of the respective resulting eccentricity of the double eccentric, and the force of the spring element causes the two eccentrics to be pivoted relative to each other in such a direction that the total eccentricity increases and thus the play between the gear wheels, which are connected to the two eccentrics, is removed. However, to simplify production, it may be useful not to provide a double eccentric but to employ an embodiment in which the disc-like transmission elements are in the form of a first guide disc which is displaceable on the adjusting shaft, which shaft is concentric with respect to the central axis of the one gear wheel, in a radial direction relative to said adjusting shaft, and a second guide disc which is connected to the first guide disc in such a way that, in the event of relative rotation therebetween, the first guide disc is displaced radially relative to the adjusting shaft.

The invention will now be further described, by way of illustrative and non-limiting example, with reference to the accompanying drawings, which are partly in diagrammatically simplified form. Corresponding components are denoted by the same reference numerals throughout the drawings.

BRIEF DESCRIPTION OF THE DRAWINGS

FIGS. 1 to 3 show the principles of operation of embodiments of the invention, more particularly FIG. 3 shows the vario-eccentric in three different positions of eccentricity, namely zero eccentricity (FIG. 3a), medium eccentricity (FIG. 3b) and maximum eccentricity (FIG. 3c);

DETAILED DESCRIPTION OF THE PREFERRED EMBODIMENTS

The embodiments shown in FIGS. 1 to 7 all comprise disc-like transmission elements in the form of eccentrics 1,2.

Figure 1:
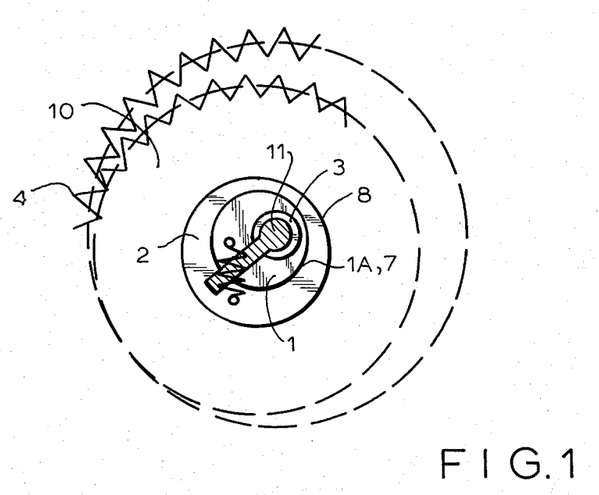
FIG. 1 shows an embodiment (vario-eccentric) with two interengaged and relatively pivotal part eccentrics 1,2.
Figure 2:
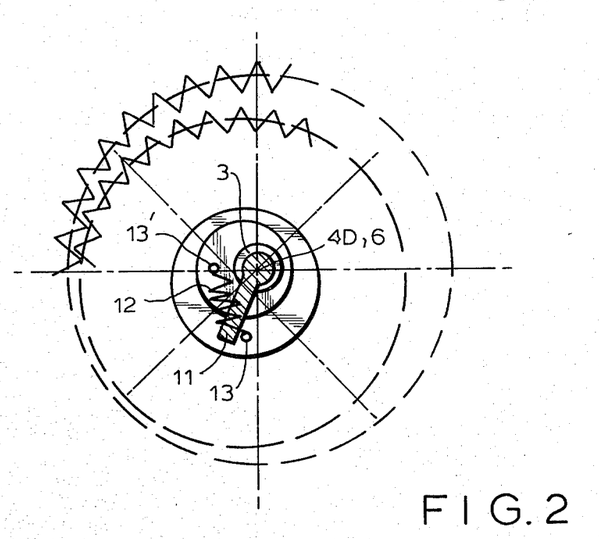
FIG. 2 shows the system of FIG. 1, but in the condition of movement.
Figure 3A:
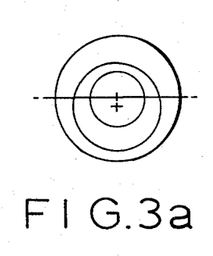
Figure 3B:
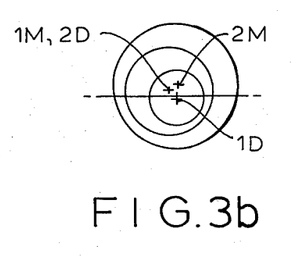
Figure 3C:
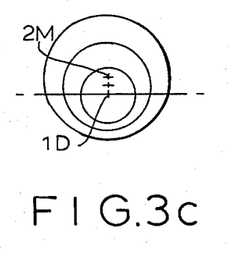
Figure 4:
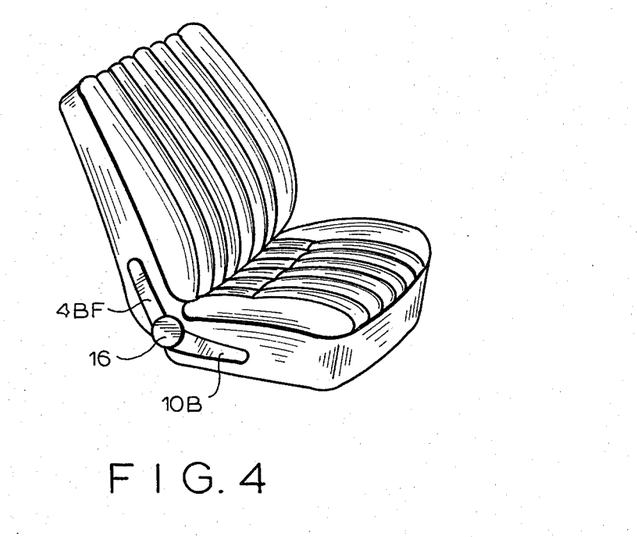
FIG. 4 shows use of the above embodiment in a motor vehicle seat.
Figure 5:
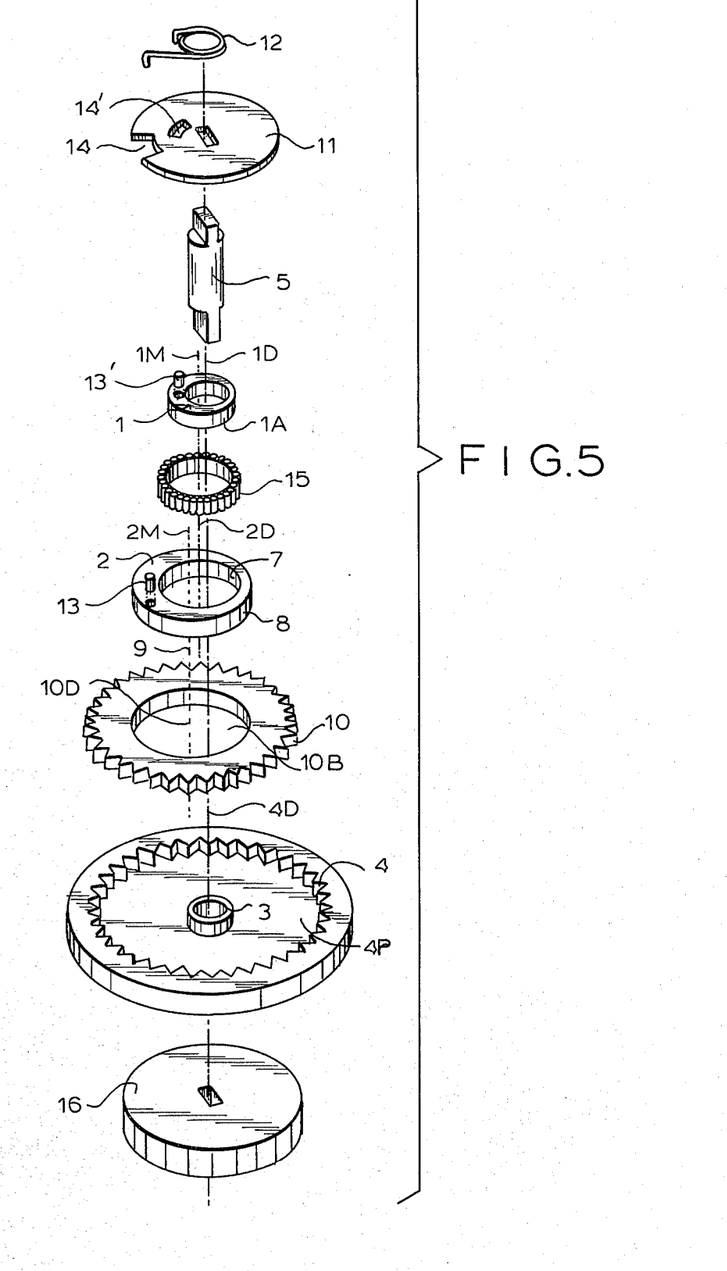
FIG. 5 is an exploded view of the components of the above embodiment.

In the embodiment shown in FIGS. 1,2 and 5 (vario-eccentric), an inner eccentric or part eccentric 1 having a central axis 1M and an axis of rotation 1D is provided with a bore by means of which it is carried slidably on a sleeve 3 which is connected to an outwardly disposed internally toothed gear wheel 4. An adjusting shaft 5 is mounted in the sleeve 3. The axes of symmetry of the sleeve 3, the outwardly disposed gear wheel 4 and the adjusting shaft 5 coincide at a point 6. An outer eccentric or part eccentric 2, having a central axis 2M and an axis of rotation 2D, is mounted so that an inner surface 7 thereof slides on the inner eccentric 1 and an outer surface 8 thereof slides in a bore 10B of the same diameter, which bore is disposed centrally (axis of symmetry 9) within a spur gear wheel 10 which is in mesh with the gear wheel 4 and is smaller than the gear wheel 4. The central axes 2M of the eccentric 2 is concentric with respect to the axes of rotation (9,10D) of the gear wheel 10. The spacing of the axes of rotation 4D,10D of the two gear wheels 4,10 is a function of the respective resulting eccentricity of the double eccentric 1,2. Rotation of the adjusting shaft 5 is transmitted to both the eccentrics 1,2, by way of an entrainment disc 11 (shown only schematically in FIGS. 1 and 2). Rotation of the eccentrics 1,2 relative to each other causes a change in the total eccentricity, which is additively composed of the two partial eccentricities resulting from the position of the part eccentrics 1,2 relative to each other. FIGS. 3a to 3c illustrate the total eccentricity, which changes with rotation of the part eccentrics 1,2 relative to each other. The two eccentrics 1,2 are connected together by a spring 12 (shown only schematically in FIGS. 1 and 2) in such a way that the eccentrics are pivoted relative to each other by the spring force in a direction such that the total eccentricity tends to increase.

When the adjusting shaft 5 is not actuated, in each instantaneous gear wheel position, the double eccentric 1,2 is of such an eccentricity, due to the effect of the spring 12, that both gear wheels 4,10 are pressed into engagement with each other without play (FIG. 1). This condition is maintained even when an externally acting force seeks to rotate the two toothed rings (4,10) relative to each other, as the double eccentric 1,2 sticks in the position in which the components are pressed together. This sticking is caused by the friction between the outer eccentric sliding surface 8 and the inside surface of the bore in the gear wheel 10, and between the sleeve 3 and the inside surface of the bore in the inner eccentric 1.

The double eccentric 1,2 is released from the position in which the components thereof are pressed against each other, when the adjusting shaft 5 begins to rotate, by a slight rotary movement of the part eccentric 1 or 2 respectively, in the direction of reducing the total degree of eccentricity (FIG. 2). The rotary movement in this direction is produced by the arrangement of entrainment pins 13′,13 on the eccentrics 1,2 and the shape of the entrainment disc 11. The entrainment pins 13,13′ and recesses 14,14′ in the entrainment disc 11 are so arranged that, upon rotary movement of the adjusting shaft 5, only the entrainment pin of one eccentric is respectively engaged by the entrainment disc 11, while the entrainment pin of the other eccentric retains a certain clearance in the associated recess in the entrainment disc. The eccentric, which is driven by way of a hand wheel 16, the adjusting shaft 5 and the entrainment disc 11, transmits its rotary movement by way of the spring 12 to the second eccentric which, due to friction between the sliding surfaces, lags in its rotary movement slightly behind the driven eccentric. This causes a small amount of radial displacement of the spur gear 10 in an inward direction and thus produces a certain (very small) amount of play between the sides of the teeth of the gear wheels 4,10, which leads to the two gear wheels 4,10 being released from the condition in which they are pressed against each other, and permits the adjusting shaft 5 to rotate easily.

During rotation of the adjusting shaft 5, by virtue of the sliding friction (instead of the static friction as above) between the first eccentric 1 and the sleeve 3 or between the second eccentric 2 and the bore 10B in the spur gear 10, the motion is controlled in such a way that, in the event of jamming of the gear wheels due to production tolerances, a small amount of play between the sides of the gear teeth is maintained. When jamming begins to occur, the sliding friction between the above-mentioned surfaces increases greatly and, as already described above with regard to the operation at the beginning of the rotary movement, causes a slight radial displacement of the spur gear 10 in an inward direction. On the other hand, in the event of play beginning to become too great, the force of the spring 12 between the two eccentrics 1,2 causes the respective non-driven eccentric to perform a take-up rotary motion and the spur gear 10 is thereby displaced slightly radially outwardly so that the play between the sides of the teeth is adjusted to a minimum value.

Thus, the non-driven eccentric lags in its rotary movement behind the driven eccentric precisely only to such an extent as is required by manufacturing tolerances.

Therefore, the vario-eccentric compensates automatically, by changing its degree of eccentricity, both for any manufacturing tolerances and also any dimensional changes due to wear.

To understand more fully the operation of the above-described entrainment operation, it should be understood that the recesses 14,14′ in the entrainment disc 11 are each of greater extent, in the peripheral direction, than the associated pin 13,13′ and the pin is arranged in the recess movably with play in the peripheral direction. When a gear wheel 4 or 10 is rotated, a pin 13 or 13′ lies against the end of the associated recess 14 or 14′ and the length of the other recess 14′ or 14 and the force of the spring 12 are such that the other pin 13′ or 13 is also moved in the peripheral direction. In fact, the lengths (in the peripheral direction) of the two recesses 14,14′ and the force of the spring 12 are such that, in one direction of rotation, a pin (13 or 13′) lies against one end of one recess (14 or 14′), while in the opposite direction of rotation the other pin (13′ or 13) lies against the opposite end of the other recess (14′ or 14).

In order to prevent the inner eccentric 1 from jamming with respect to the outer eccentric 2, a rolling bearing 15 is provided between the two eccentrics. The recesses 14,14′ in the entrainment disc 11 are limited to a certain angular extent in order to ensure that the spring 12 acting between the two eccentrics 1,2 cannot be overstressed by external forces acting thereon.

When there is a change in the direction of rotation, the function of the driven eccentric and the eccentric, which is entrained by the spring action, is also interchanged. This provides that the same control mechanisms come into operation automatically when the adjusting shaft 5 is rotated, irrespective of the direction of rotation.

After the adjusting operation is concluded, the spring force acting on the two eccentrics 1,2 causes the components automatically the return to the condition of being pressed together, thereby ensuring that the eccentric transmission assembly is free from play.

It is advantageous in the above-described eccentric mechanism for the degrees of eccentricity of both part eccentrics 1,2 to be made of equal magnitude. If, by a suitable adjusting mechanism, both eccentrics are brought into an opposed position (FIG. 3a), the two part eccentricities are added together to give a total eccentricity of zero. This means that both toothed rings (gear wheels) 4,10 are entirely disengaged from each other, thereby permitting the inclination of a seat backrest (e.g. of a motor vehicle seat) to which the mechanism is fitted (FIG. 4) to be easily adjusted over wide ranges of angular movement. After this coarse adjustment has been concluded, adjustment of the angular position may be continuously set without play, by re-engaging the two toothed rings 4,10 with each other. The backrest of the seat, in this arrangement, is non-rotatably fixedly connected to one of the gear wheels 4,10 and the other gear wheel is non-rotatably mounted at a position fixed with respect to the vehicle floor. For example, as shown, one of the gear wheels 4,10 of the transmission is connected by way of a securing arm 4BF or 10BF to the backrest of the seat, while the second gear wheel 10 or 4 is connected to the bottom portion of the seat by way of a securing arm 10BF or 4BF of the same kind. When the hand wheel 16 is actuated, the two gear wheels are caused to roll against each other, thereby effecting adjustment of the angle of inclination of the backrest.

Preferably, the maximum possible degree of eccentricity of the double eccentric 1,2 is at least equal to, and preferably greater than, the difference in the radii of the two pitch circles of the two gear wheels 4,10.

Figure 6A:
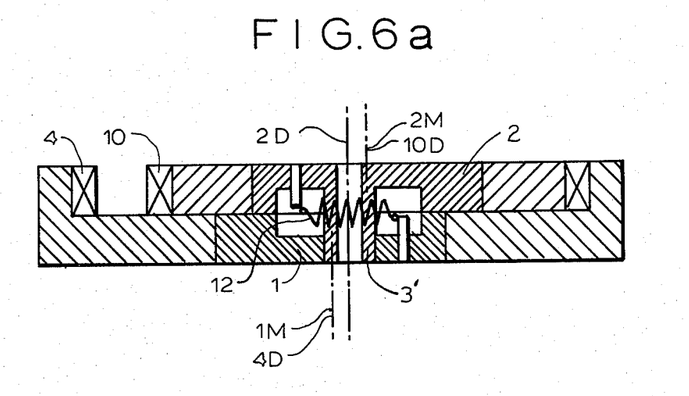
FIGS. 6a to 6c show an advantageous alternative form of the embodiment of FIG. 5, with only a small number of individual components which are different from each other, FIG. 6a showing a sectional view in highly simplified diagrammatic form, FIG. 6b showing a sectional view of a possible technical construction of the alternative form shown in FIG. 6a, and FIG. 6c showing an exploded view of this alternative form.
Figure 6B:
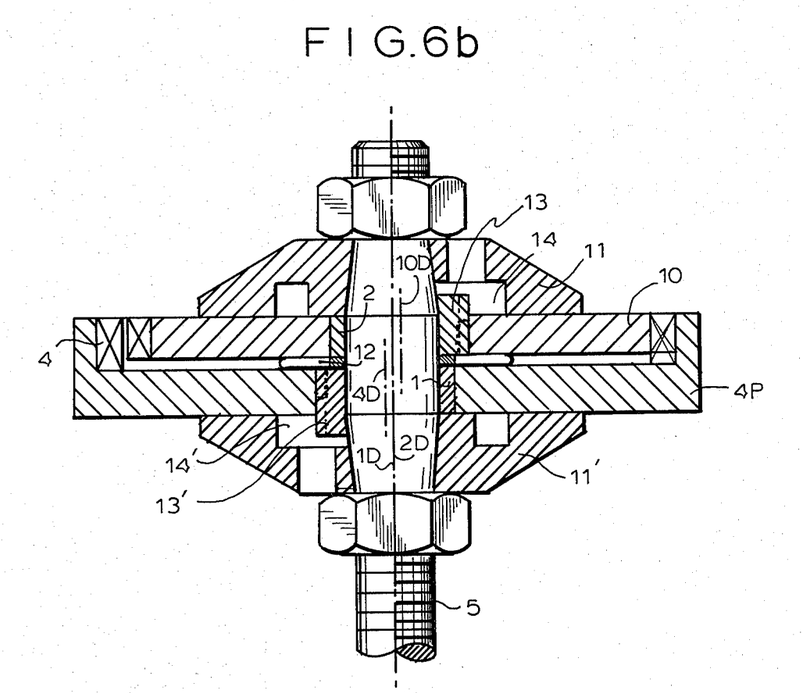
Figure 6C:
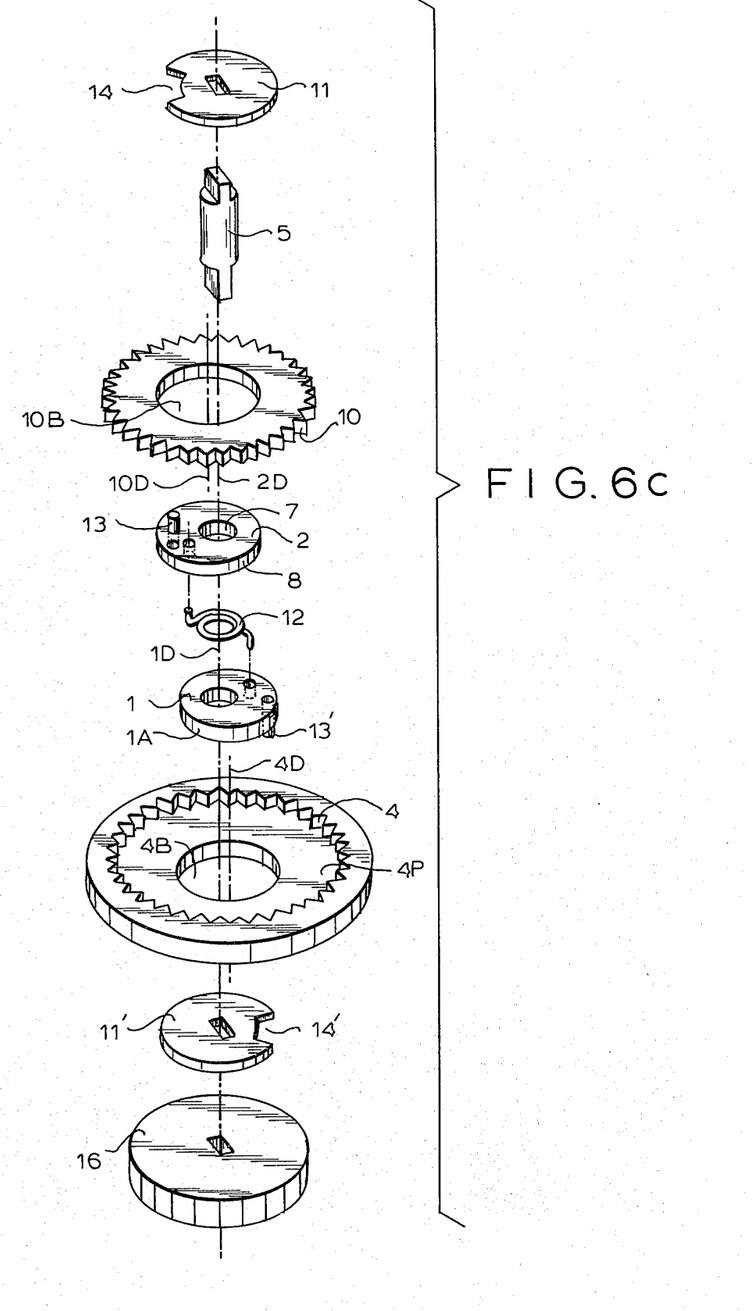

FIGS. 6a to 6c show an advantageous alternative form of the embodiment shown in FIGS. 1,2 and 5, wherein the rolling bearing is unnecessary by virtue of suitable selection of the geometrical dimensions of the eccentrics. For greater clarity of the drawing, it is assumed that the two gear wheels 4 and 10 are fully engaged with each other, at the maximum possible degree of eccentricity of the double eccentric 1,2 (FIG. 3c: all axes of the eccentrics lying in one plane). The inner eccentric 1 slides in a bore of the same diameter in the gear wheel with the internally toothed ring 4, the central axis 1M of the eccentric 1 and the axis 4D of the gear wheel 4 coinciding. The outer eccentric 2 slides in a bore of the same diameter in the gear wheel 10; the central axis 2M of the second eccentric and the axis 10D of the gear wheel 10 also coincide. The diameters of the two eccentrics 1,2 are equal. Both eccentrics are connected together either by a sleeve 3' formed around the axis of rotation 2D of one eccentric 2, with the other eccentric 1 mounted rotatably about the sleeve (FIG. 6a) or by the adjusting shaft 5 (FIGS. 6b and 6c).

The embodiment of FIGS. 6a to 6c is distinguished by low production costs since both the eccentrics 1,2 and both entrainment discs 11,11' can each be totally identical to the other and the rolling bearing 15 of the preceding embodiment is omitted.

Figure 7:
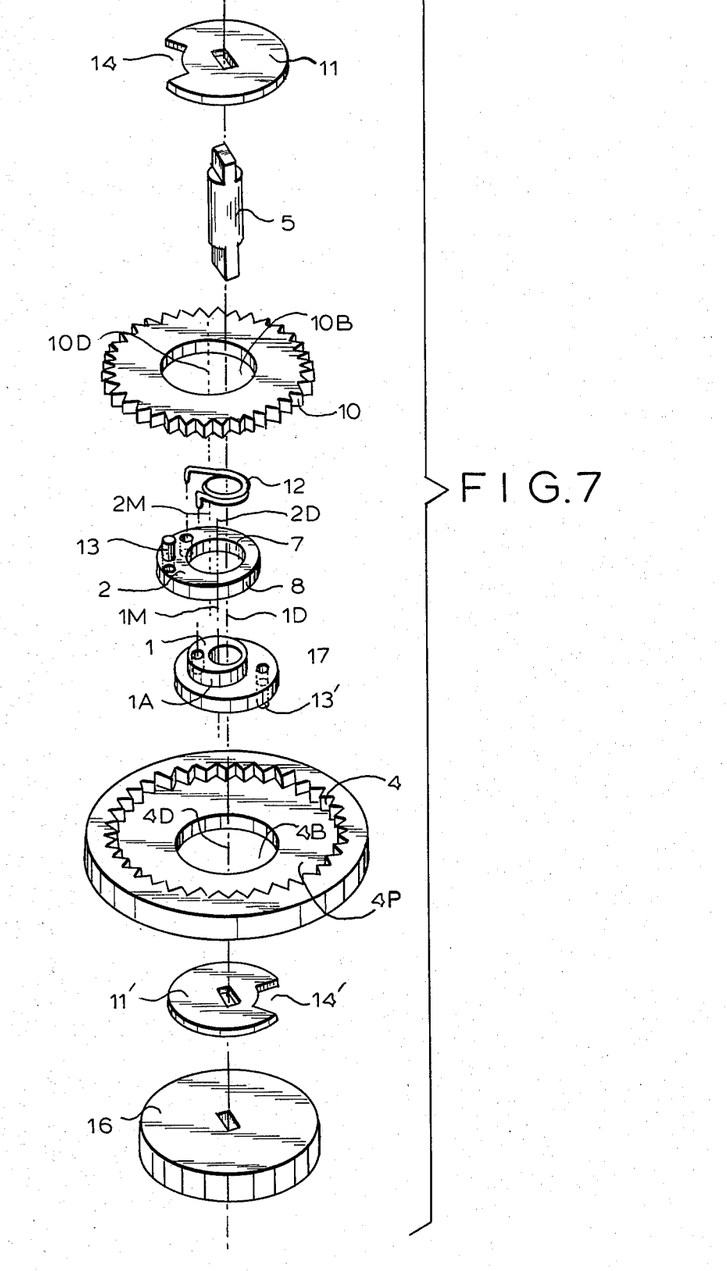
FIG. 7 shows an exploded view of another embodiment.

FIG. 7 shows an embodiment wherein the rolling bearing 15 becomes unnecessary because the smaller eccentric 1 is fixedly connected to a circular disc 17 whose diameter corresponds to that of the second eccentric 2. As in the embodiment of FIGS. 6a to 6c, the eccentric 2 and the circular disc member 17 of the eccentric 1 are received by concentric bores 4B and 10B respectively in the gear wheels 4 (4P) and 10 respectively. The selected dimensions ensure that, during the rotating operation, the frictional moments which occur in the bores of the gear wheels 4,10 and which are required to keep the play at a minimum are greater than the moment of the frictional force between the surfaces 1A and 7 of the two eccentrics. The transmission system is driven by way of two entrainment discs 11,11', which are fixedly connected to the adjusting shaft 5 and entrainment pins 13,13' of the eccentrics 2,1, which pins engage into the recesses 14,14' in the entrainment discs.

Figures 8, 9:
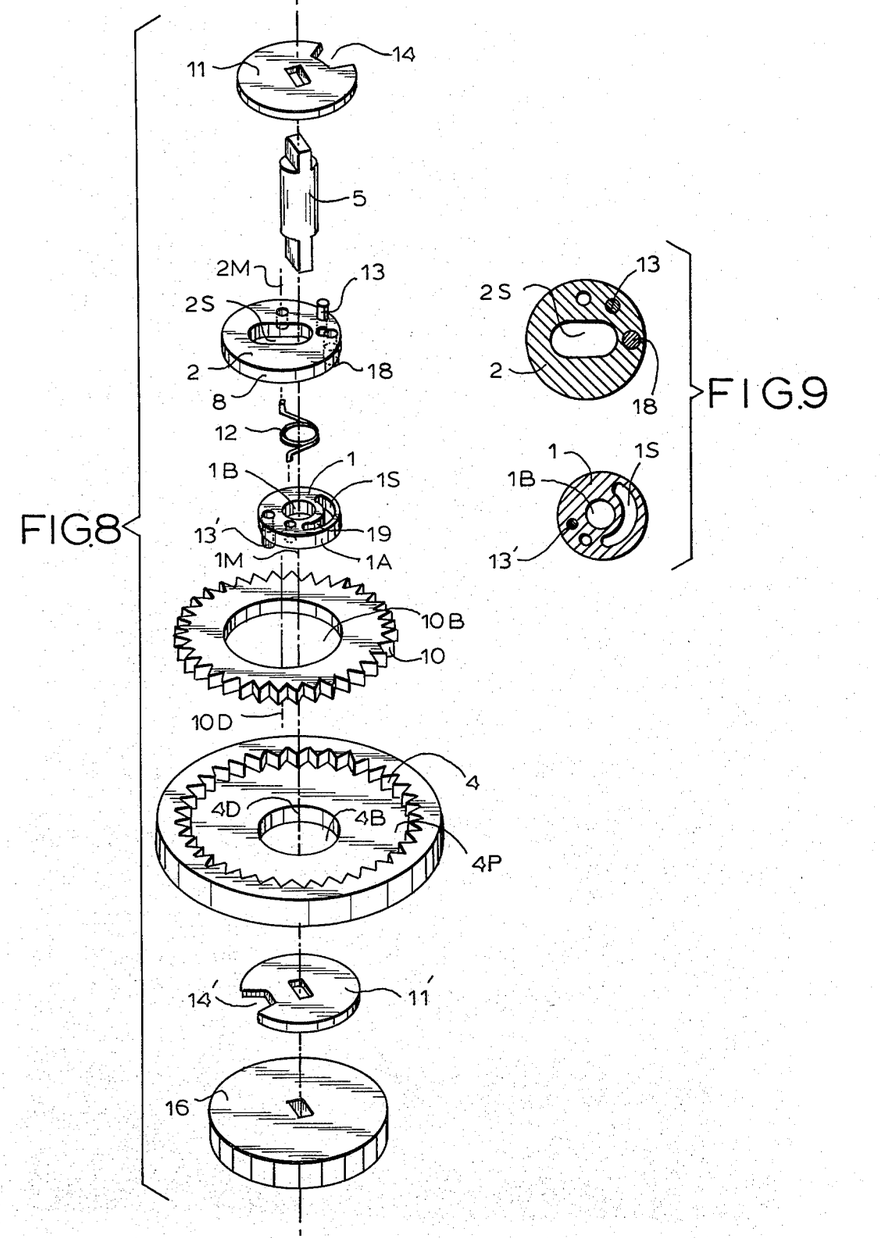
FIG. 8 shows an exploded view of another embodiment wherein, instead of eccentric discs, other guide discs are used.
FIG. 9 shows a sectional view taken perpendicularly to the axis of rotation, through the guide discs shown in FIG. 8.

In the embodiment shown in FIGS. 8 and 9, a first circular disc 1 with a spirally extending recess 1S is arranged rotatably in a concentric bore 4B in a plate 4P which is connected to the internally toothed gear wheel 4. The disc 1 in turn has a concentric bore 1B for receiving the adjusting shaft 5. The spur gear 10, which is disposed eccentrically with respect to the internally toothed gear wheel 4, has a bore 10B which is concentric with respect to the spur gear tooth ring, for receiving a second circular disc 2 with a radial slot 2S. Fixedly connected to the disc 2 is a guide or mounting pin 18 which engages into the spiral recess 1S in the first disc 1.

(For the sake of simplicity of language, the two discs 1 and 2 with the radial guide surface and the spiral guide surface respectively are jointly referred to hereinafter as 'guide discs').

The distance of the pin 18 from the central axis 2M of the guide disc 2 is such that, after the adjusting shaft 5 has been fitted into the central recesses 1B and 2B of the guide discs 1,2 with the spring 12 being omitted, both gear wheels 4 and 10 would mesh with play. The force of the spring 12 causes both guide discs 1,2 to rotate relative to each other. In this event the pin 18 which is connected to the one guide disc 2 slides along the guide surface 19 of the spirally extending slot 1S of the other guide disc 1 and displaces the guide disc 2, in which the pin is secured, and the gear wheel 10, which is arranged concentrically with respect to said guide disc, in the radial direction. The path of the spiral is such that, when the two guide discs 1,2 rotate relative to each other under the effect of the force of the spring, the gear wheel 10 is displaced outwardly in the direction of the point of engagement of the two gear wheels, until there is play-free engagement between the two sets of teeth. As in the embodiments of FIGS. 6 and 7, the transmission means is driven by way of two entrainment discs 11 and 11' which are fixedly connected to the adjusting shaft 5.

During the rotary movement of the adjusting shaft 5, when jamming tends to begin, the respective guide disc 2 or 1 which is not engaged by the entrainment discs 11 and 11' respectively lags slightly behind in the rotary movement, by virtue of sliding friction, relative to the guide disc 1 or 2 which is driven by the other entrainment disc 11' and 11, respectively. In this event, the pin 18 which is connected to the one guide disc 2 slides along the guide surface 19 of the spiral slot 1S in the other guide disc 1 in such a direction as to produce radial displacement of the spur gear 10 inwardly, until the 'threatening' jamming is eliminated.

With regard to the mode of operation of this embodiment, it does not matter if, unlike FIG. 8, the guide disc is fitted into the respective other gear wheels. It also does not matter if the spiral and the radial recess are provided in one disc and the central bore and the guide pin are provided in the other disc.

An advantageous alternative form of this embodiment is produced if the part of the guide pin which projects into the guide slot in the one disc is surrounded by a ball bearing assembly for reducing friction.

Another advantageous alternative form is produced by the guide pin being mounted rotatably in its guide disc and by the part of the pin which engages into the guide slot in the other guide disc being adapted to the shape of the sides of the slot.

For many purposes, it is advantageous for the radial slot 2S in the guide disc 2 to be longer than the depth of the teeth of the interengaging gear wheels. If the two disc-like transmission elements 1,2 are moved into a concentric position relative to each other, both gear wheels 4 and 10 are brought entirely out of engagement thereby permitting rapid adjustment of the angle of inclination of the backrest of the seat, over wide ranges of angular movement. When this coarse adjustment is concluded, adjustment of the angle of inclination may be continuously set again without play, by reengaging the two toothed rings with each other.

I claim:

1. Apparatus for eliminating play between two interengaged gear wheels (4, 10) of a gear wheel transmission which is self-locking in relation to a moment of rotation acting on the output side and includes two disc-like transmission elements (1, 2) each associated with the respective gear wheel, characterized by the combination of the following features:
   (a) the central axis (2M or 1M) of each of the disc-like transmission elements (2 or 1) is concentric with respect to the axis of rotation (10D or 4D) of the respective gear wheel (10 or 4);
   (b) the spacing of the axes of rotation (4D, 10D) of the two gear wheels (4, 10) is a function of the rotation of the disc-like transmission elements (1, 2) relative to each other;
   (c) a spring (12) is connected to both disc-like transmission elements (1, 2) in such a way that the two disc-like transmission elements (1, 2) are pivoted relative to each other by the spring force in a direction, such that the displacement of the central axes (1M, 2M) of the disc-like transmission elements relative to each other in radial direction increases and thus play between the gear wheels (4, 10), which are connected to the respective disc-like transmission elements (1, 2), is removed; and
   (d) a handle (16) is connected to one of said gear wheels (10) by way of an adjusting shaft (5) and the disc-like transmission elements (1, 2) in such a way that, upon rotary movement in either of the two directions of rotation, said one gear wheel is rotated relative to the other gear wheel (4) and at the same time the respective disc-like transmission element (1, 2) is moved in the direction of slightly increasing the play between the two gear wheels (4, 10).

2. Apparatus according to claim 1, wherein the disc-like transmission elements (1,2) are in the form of two single eccentrics which are arranged movably relative to each other and which are arranged as a double eccentric, means are provided which cause the spacing of the axes of rotation (4D,10D) of the two gear wheels (4,10) to be a function of the respective resulting eccentricity of the double eccentric (1,2), and the force of the spring element (12) causes the two eccentrics (1,2) to be pivoted relative to each other in such a direction that the total eccentricity increases and thus the play between the gear wheels (4,10), which are connected to the two eccentrics (1,2), is removed.

3. Apparatus according to claim 2, wherein the axis of rotation (1D) of one eccentric (1) of said two eccentrics is concentric with respect to the axis of rotation (4D) of said other gear wheel (4).

4. Apparatus according to claim 3, wherein the two eccentrics (1, 2) are fitted one into the other and are pivotal relative to each other.

5. Apparatus according to claim 4, including a bearing (15) arranged between the two eccentrics (1,2), the bearing (15) having a lower degree of frictional resistance than the friction between a sliding surface of one eccentric (1 or 2) and one of the gear wheels (4 or 10) and also less than the friction between the other gear wheel (10 or 4) and an associated sliding surface of the other eccentric (2 or 1).

6. Apparatus according to claim 2, wherein the central axis (1M or 2M) of each of said two eccentrics (1 or 2) is concentric with respect to the axis of rotation (4D or 10D) of the respective gear wheel (4 or 10).

7. Apparatus according to claim 2, wherein the gear wheel transmission comprises a larger gear wheel (4) provided with internal teeth and a smaller gear wheel (10) which meshes with the gear wheel (4) and which is provided with external teeth, and the maximum possible degree of eccentricity of the double eccentric (1,2) is at least equal to the difference in the radii of the two pitch circles of the two gear wheels (10,4).

8. Apparatus according to claim 7, wherein the degrees of eccentricity of the two single eccentrics (1,2) are of equal magnitude.

9. Apparatus according to claim 1, wherein the disc-like transmission elements are in the form of a first guide disc (2) which is displaceable on the adjusting shaft (5), which shaft is concentric with respect to the central axis of the other gear wheel (4), in a radial direction relative to said adjusting shaft, and a second guide disc (1) which is connected to the first guide disc in such a way that, in the event of relative rotation therebetween, the first guide disc (2) is displaced radially relative to the adjusting shaft (5).

10. Apparatus according to claim 9, wherein the second guide disc (1) has a guide surface (19) which extends eccentrically with respect to the axis of rotation thereof and against which lies a connecting member (18) which is fixedly connected to the first guide disc (2).

11. Apparatus according to claim 10, wherein the guide surface (19) which extends eccentrically with respect to the axis of rotation thereof is in the form of a spiral.

12. Apparatus according to claim 11, wherein the connecting member (18) which lies against the guide surface (19) is a pin rotatably mounted in the first guide disc (2) and has a head portion which is adapted to the shape of the sides of the guide surface of the second guide disc (1).

13. Apparatus according to claim 12, wherein the guide surface (19) is in the form of the side of a slot-shaped recess provided in one of the guide discs (1, 2).

14. Apparatus according to claim 13, wherein the pin (18) serving as a connecting element is rotatably mounted in the first guide disc (2) by means of a ball bearing assembly.

15. Apparatus according to claim 13, wherein the pin (18) serving as a connecting element is rotatably mounted by means of a ball bearing assembly provided between a head portion of the pin and the guide surface of the second guide disc (1).

16. Apparatus according to claim 9, wherein the gear wheel transmission comprises a larger gear wheel (4) provided with internal teeth and a smaller gear wheel (10) which engages with the gear wheel (4) and which is provided with external teeth, and the maximum operative range of movement of the two guide discs (1,2) relative to each other in the radial direction is at least equal to the difference between the radii of the two pitch circles of the two gear wheels (4,10).

17. Apparatus according to claim 16, wherein the maximum operative range of movement of the two guide discs (1,2) relative to each other in the radial direction is of such a magnitude that, by movement in the direction of an increase in the play, the two interengaging gear wheels (4,10) can be brought out of engagement.

18. Apparatus according to claim 1, further comprising an entrainment device which comprises entrainment means (11, 11') and pins (13, 13') which engage into recesses provided in the disc-like transmission elements (1, 2) and secured to the entrainment means.

19. Apparatus according to claim 1, comprising an entrainment device including entrainment means (11, 11') and pins (13, 13') engaged into respective recesses (14, 14') provided in the entrainment means (11, 11') and secured to the respective disc-like transmission elements.

20. Apparatus according to claim 19, wherein the entrainment means (11) is non-rotatably connected to the handle (16) and has one of said recesses (14 or 14') into which the respective pin (13 or 13') which is fixedly connected to the respective disc-like transmission element (2 or 1) engages in such a way that, upon rotary movement of the handle (16), said respective disc-like transmission element is pivoted and therewith a rolling movement of one of said gear wheels (4 or 10) on the other gear wheel (10 or 4) is initiated.

21. Apparatus according to claim 19, wherein the entrainment means (11) has two recesses (14, 14') and a respective pin (13, 13') engages into a respective recess pin (13, 13') being fixedly connected to a respective disc-like transmission element (2, 1).

22. Apparatus according to claim 21, wherein the two recesses (14, 14') in the entrainment means (11) are each of greater extent, in the peripheral direction with respect to the axis of the entrainment means, than the associated pin (13 or 13') and the respective pin is arranged in the respective recess (14 or 14') movably with play in the peripheral direction.

23. Apparatus according to claim 22, wherein, when the adjusting shaft (5) is rotated, the respective pin (13 or 13') lies against the end of the associated recess (14 or 14') of the entrainment means (11) and the length of the other recess (14' or 14) and the force of the spring (12) are such that the other pin (13' or 13) is also moved in the peripheral direction.

24. Apparatus according to claim 23, wherein the length, in the peripheral direction, of each of the two recesses (14, 14') and the force of the spring (12) are such that, in one direction of rotation, the respective pin (13 or 13') lies against one end of the associated recess (14, 14'), while in the opposite direction of rotation the other pin (13' or 13) lies against the opposite end of the other recess (14' or 14).

25. Apparatus according to claim 24, wherein the disc-like transmission elements (1,2) are disposed between the entrainment means (11,11'), which are of a disc-like configuration.

26. Apparatus according to claim 1, which is formed as an adjusting means for adjusting the inclination of the backrest of a motor vehicle seat, wherein the backrest of the seat is non-rotatably fixedly connected to one of the gear wheels (4 or 10) of the gear wheel transmission and the other gear wheel (10 or 4) is non-rotatably mounted at a position fixed with respect to the vehicle floor.

27. Apparatus according to claim 26, wherein the other gear wheel is mounted to the bottom portion of the seat.

* * * * *